United States Patent [19]

DeWitt

[11] 4,418,178

[45] Nov. 29, 1983

[54] IMPACT MODIFIED POLYMERS OF CYCLOOLEFINS

[75] Inventor: Elmer J. DeWitt, Cuyahoga Falls, Ohio

[73] Assignee: The B. F. Goodrich Company, Akron, Ohio

[21] Appl. No.: 427,368

[22] Filed: Sep. 29, 1982

[51] Int. Cl.³ .................. C08L 23/06; C08L 23/12; C08L 45/00; C08L 9/00
[52] U.S. Cl. ........................ 525/97; 525/71; 525/249; 525/276; 525/289; 525/290
[58] Field of Search ............. 525/289, 249, 276, 290, 525/97

[56] References Cited

U.S. PATENT DOCUMENTS 4,005,156 1/1977 Schmeriing ............... 525/289
4,140,731 2/1979 Nakamura et al. ............ 525/289

*Primary Examiner*—Carman J. Seccuro
*Attorney, Agent, or Firm*—George A. Kap

[57] ABSTRACT

Impact modified polycycloolefin is made by ring opening bulk polymerization of at least one monomer containing at least one norbornene group in presence of an organoammonium molybdate or tungstate catalyst and an alkoxyalkylaluminum halide cocatalyst as well as a sufficient amount of a polyolefin powder and a rubbery material to produce ductile polycycloolefin.

11 Claims, No Drawings

IMPACT MODIFIED POLYMERS OF CYCLOOLEFINS

BACKGROUND OF THE INVENTION

Polycycloolefins can be prepared by solution ring opening polymerization of at least one cycloolefin that contains at least one norbornene group. The polymerization reaction yields a honey-like cement containing about 15% solids that comprises polymer solids dissolved in a solvent. The polymer is then precipitated and separated from the cement in a known manner.

The resulting polymer, that can be a homopolymer, copolymer, terpolymer, etc., is brittle and requires modification to make it suitable for commercial applications. For instance, notched Izod value of unmodified polymethyltetracyclodecedene is 44 J/M, which reflects the brittle character of the polymer and which for many applications is an unacceptably low impact strength resistance.

It is well known to use rubbery materials as impact modifiers in polymer systems. An attempt was initially made to use a conventional impact modifier for polycycloolefins, however, it proved dissappointing. Only a small improvement in toughness to 85 J/M was observed when 5 parts of a hydrogenated block copolymer of styrene-butadiene-styrene was dissolved in 5-methyltetracyclododecene and polymerized in bulk in the usual manner with a ring opening catalyst. The material was also observed to have a brittle character, as in the case of unmodified polymethyltetracyclododecene. Other conventional impact modifiers that were also tried were acrylonitrile-butadiene-styrene and methyl methacrylate-styrene-butadiene rubbery materials. These impact modifiers in polymethyltetracyclododecene resulted in negligible improvement in toughness to about 50 J/M.

This invention is an improvement over a companion application Ser. No. 427,369 filed on Sept. 29, 1982 for inventors DeWitt, Minchak, Lee and Benedikt entitled "Impact Modified Polycycloolefins" which discloses the use of polyolefin powders in excess of about 5 parts per 100 parts of the monomers as impact modifiers for polycycloolefins prepared by bulk polymerization. Although polyolefins have been used in the past as lubricants or slip agents in PVC and other polymer systems in amounts less than about 1%, the use of polyolefins in amount in excess of about 5 parts in polycycloolefins to obtain about a tripling of impact strength was totally unexpected.

SUMMARY OF THE INVENTION

This invention relates to impact modification of polycycloolefins that are prepared by ring opening polymerization in bulk of at least one monomer containing at least one norbornene group in presence of a polyolefin or polyvinylidene fluoride powder and a rubbery material. The impact modified polycycloolefins are ductile whereas unmodified polycycloolefins are brittle.

DETAILED DESCRIPTION OF THE INVENTION

This invention relates to impact modification of polycycloolefins by the use of a polyolefin powder and a rubbery material whereby a synergistic improvement in impact properties and ductile fracture are obtained. Impact modified polycycloolefins are prepared by ring opening polymerization in bulk of one or more cycloolefins together with a polyolefin powder and a rubbery material.

Suitable polyolefins contain 2 to 6 carbon atoms in the repeating unit and preferably 2 to 3. This includes low density to high density polyethylene, linear low density polyethylene, and low and high and ultra high molecular weight polyethylene. Low density polyethylene is characterized by a density of about 0.910 to 0.925, high density polyethylene has a density of about 0.941 to 0.965, and medium density polyethylene has an intermediate density of about 0.926 to 0.940.

Suitable polyolefin impact modifiers are solid and in a particulate form at ambient conditions with a density of about 0.91 to 0.97 g/cc. Preferred polyolefin impact modifiers are powdered and have very small particle size. Generally speaking, powder is defined in terms of particle size that is, on the average, smaller than about 1 millimeter (1000 microns), more preferably smaller than about one-half millimeter and even smaller than 0.1 millimeter, such as about 10 to 50 microns. These impact modifiers are not rubbery at room temperature due to their high crystalline content. Depending on density, heat distortion temperature of polyethylene is about 32° to 54° C. and that of polypropylene is about 50° to 60° C.

A specific example of a low density polyethylene suitable herein is Union Carbide's DXNG polyethylene that has a density of 0.926 g/cc, melt index of 12, and average particle size of 105 to 250 microns. Arco's polyethylene SDP 1113 falls into the same category of average particle size of 125 to 250 microns, its density is high at 0.958 and it has a melt index of 16 to 18. Arco's polyethylene SDP 1114 has a very small average particle size of 50 to 60 microns, density of 0.95, and melt index of 0.1 to 0.2. Hercules 1900 is an ultra high molecular weight polyethylene that has a density of 0.95, melt index of 0.0, and an average particle size of about 420 microns. Microthene 510 (L-38) is a polyethylene powder that has a very small average particle size of 24 microns, a low density of 0.924 g/cc, and a melt index of 5. An example of a polyvinylidene fluoride is polyvinylidene fluoride which has a density of 1.74 and a Tg of 13° C. The higher the melt index the easier the material flows through a capillary under heat and pressure which, generally, is also a measure of molecular weight. Molecular weight and melt index are inversely proportional.

The rubbery materials suitable herein include those that are soluble in the monomers or a mixture thereof and those that also do not kill or substantially inhibit the action of the metathesis catalyst that is used in the polymerization of cycloolefins. Suitable rubbery materials include the ethylene-containing rubbery materials that have Tg below room temperature. Also suitable are diene rubbers, hydrogenated or not, which include polybutadiene, copolymers and terpolymers of butadiene and block polymers of butadiene, all of which are readily available. The rubbery material is dissolved in a polycycloolefin in concentration of up to about 5%. Concentrations above 5% are usually too viscous.

Also suitable are olefinic rubbers that are elastomeric copolymers of ethylene and propylene and terpolymers thereof with a diene. The preferred diene is a nonconjugated diene. Ethylene content of such elastomeric polymers is at least about 40 mole %, preferably at least 50 mole %, the balance being propylene, and in the case of the terpolymers, a minor amount of a diene on the order of less than about 10 mole % and usually not over 5%. The nonconjugated diene can be any one or more of those generally known in the art but preferably is 1,4-hexadiene, ethylidene norbornenes, cyclooctadiene or dicyclopentadiene. Minor amounts of other copolymerizable monomers such as hexene, butene and so forth, can be used as long as they do not adversely affect the properties of the elastomeric polymers. Blends of the polymers can be used as well as mixtures of dienes.

The olefin rubbers are polymers of propylene and ethylene as noted above. Other rubbers are obtained from higher olefins, such as butenes, pentenes, etc. They are characterized by having a rubbery or elastomeric nature at room temperature.

Surprisingly, acrylonitrile-butadiene-styrene rubbers did not work. It appears that the presence of the nitrile groups kills or substantially inhibits activity of the catalyst employed for polymerizing cycloolefins. For this reason, the use of acrylonitrile containing or nitrile containing rubbers is to be avoided.

The relative amounts of a polyolefin and a rubbery material can be varied widely to obtain improvement in impact strength of polycycloolefins. In a preferred embodiment, the relative ratio of the two impact modifying components should be such as to impart a ductile mode to the polycycloolefins on fracture, which occurs at a notched Izod of about 250 J/M and above. A ductile material fractures in a ductile manner as opposed to the brittle or glassy mode. More specifically, amount of the polyolefin should be 2 parts and greater whereas amount of the rubbery material should be 1 part and greater, based on 100 parts by weight of cycloolefin monomer or monomers. In a preferred embodiment, amount of the polyolefin can be in the range of about 5 to 15 parts by weight and the rubbery material can vary in the range of about 2 to 10 parts by weight, per 100 parts of cycloolefin monomer or a mixture of such monomers.

Impact modified polycycloolefins are prepared by bulk polymerization. The experimental procedure involves the use of a vessel fitted with a nitrogen line so that the mixing of the components can be carried out under a blanket of nitrogen. To the vessel are added, with mixing or shaking, the monomer or a mixture thereof, an antioxidant and the impact modifying components in powder form. This is followed by addition of an alcohol or another source of a hydroxyl or an alkoxy group, in the monomer; an alkylaluminum halide also dissolved in the monomer; and an ammonium molybdate or tungstate compound catalyst, also in the monomer. All these ingredients are added to the vessel while the vessel is flushed with nitrogen. After shaking the vessel to mix the ingredients, the vacuum is applied to remove dissolved gases in the vessel and then, vacuum is broken with nitrogen and vessel contents are poured into a preheated mold. When the monomer mix is introduced into the preheated mold, polymerization is thermally initiated and is completed very quickly. Upon opening of the mold, a hard, plastic object is recovered.

The alcohol and the alkylaluminum halide react in situ to form an alkoxyalkylaluminum halide cocatalyst of the following formula:

where R is an alkyl radical containing about 1 to 18 carbon atoms, preferably 2 to 4; $R^1$ is an alkyl radical containing 1 to 12 carbon atoms, preferably 2 to 4; X is a halogen selected from chlorine, iodine, bromine and fluorine, preferably chlorine; "a" is a number indicating equivalents of the alkoxy moiety RO— and can vary from a minimum of about ½ to a maximum of about 2½, preferably from about 1 to about 1¾; "b" indicates the number of atoms of alkyl group $R^1$ and can vary from a minimum of about ¼ to a maximum of about 2, preferably from about ½ to about 1; and "c" indicates the number of halogen atoms X and can vary from a minimum of about ½ to a maximum of about 2, preferably from about ¾ to about 1¼. In all of the cocatalysts defined by the ranges herein, one atom of aluminum is combined with the indicated equivalents of the other components.

It has been discovered that the cocatalyst, to be useful in a bulk polymerization system described herein, must contain at least some halogen X, some alkoxy group RO, and some alkyl group R', along with aluminum. When the cocatalyst in the system is a trialkylaluminum ($R'_3Al$), the polymerization product is a viscous cement and conversion of only up to about 30% is achieved even at temperature as high as 140° C. With aluminum trihalide ($AlCl_3$) or trialkoxyaluminum (($RO)_3Al$) as cocatalysts in the system, very little or no polymerization takes place. Same is true of dialkoxyaluminum halide, since it does not contain the alkyl group.

The alkoxyalkylaluminum cocatalyst is obtained by the modification of an alkylaluminum halide. This is achieved by introducing an alkoxy group therein either with oxygen, an alcohol, a phenol, or in other ways. When using an alcohol, such as ethanol or propanol, the alcohol can be prereacted with the alkylaluminum halide before adding the cocatalyst to the system. Suitable alcohol is one which yields an alkoxy alkylaluminum halide cocatalyst that is soluble in the cycloolefin monomer. Such a reaction is conducted in absence of water by providing a blanket of nitrogen and mixing the two ingredients. The reaction is rapid and results in evolution of volatile hydrocarbons, such as ethane if diethylaluminum is used. The reaction goes essentially to 100% completion.

Instead of prereacting the alcohol with the alkylaluminum halide, the alcohol and the alkylaluminum halide can be reacted in situ. The alkoxy groups are provided by the alcohols, of course, however, alkoxy groups can be supplied by other hydroxyl containing materials that come in contact with the alkylaluminum halide before or during polymerization. For instance, any ingredient in the formulation that contains hydroxyl groups can provide such groups for reaction with the alkylaluminum halide to inhibit its reducing potency. Examples of such materials are certain fillers and phenolic stabilizers that have available hydroxyl groups for reaction with the alkylaluminum halide. In such a case, when a suitable hydroxyl-containing filler is mixed with the ingredients of a formulation, including the alkylaluminum halide, the hydroxyl groups on the filler react with the alkylaluminum halide whereby an alkoxy group becomes attached to aluminum. The alkoxy group in the alkylaluminum halide functions to inhibit reducing power of the alkylaluminum halide by replacing some of the alkyl groups on the aluminum thus making it possible to react the cyclic olefins via bulk polymerization. It should be understood that the use of excess oxygen or alcohol or a hydroxyl containing material over the stoichiometric amount of alkyl groups present in the alkylaluminum moiety, should be avoided in order not to render the aluminum compound ineffective as a reducing agent.

Suitable catalysts are organoammonium molybdates and tungstates are selected from those defined as follows:

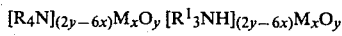

where O represents oxygen; M represents either molybdenum or tungsten; x and y represent the number of M and O atoms in the molecule based on the valence of +6 for molybdenum, +6 for tungsten, and −2 for oxygen; and the R and $R^1$ radicals can be same or different and are selected from hydrogen, alkyl, and alkylene groups each containing from 1 to 20 carbon atoms, and cycloaliphatic groups each containing from 5 to 16 carbon atoms. All of the R and $R^1$ radicals cannot be hydrogens or be small in the number of carbon atoms since such a condition will render the molecule essentially insoluble in hydrocarbons and most organic solvents. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

It has been found that in the case of the organoammonium molybdates and tungstates represented by the formula

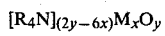

where all R radicals are the same, each can contain from 4 to 18 carbon atoms. Where three R radicals are the same, each containing from 7 to 18 carbon atoms, the remaining R can contain from 1 to 18 carbon atoms. Where three R radicals are the same, each containing 4 to 6 carbon atoms, the remaining R radical can contain 4 to 18 carbon atoms. In the case where two of the four R radicals are the same, the two same R radicals can each contain from 12 to 18 carbon atoms and the remaining two R radicals can contain from 1 to 18 carbon atoms. With respect to each other, the remaining two R radicals can be same or different as long as each contains 1 to 18 carbon atoms. Where all R radicals are different, the sum thereof can be in the range of 20 to 72 carbon atoms.

Similar remarks apply to organoammonium molybdates and tungstates that are defined by the following formulas:

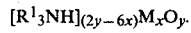

The $R^1$ radicals cannot be too small if the molecule is to be soluble in a hydrocarbon reaction solvent and/or a norbornene-type monomer. Where all $R^1$ radicals are the same in the above formula, each can contain from 5 to 18 carbon atoms. Where two $R^1$ radicals are the same or all the $R^1$ radicals are different, each can contain from 1 to 18 carbon atoms and the sum thereof can be in the range of 15 to 72 carbon atoms. Included herein are also compounds wherein $R^1$ radical is hydrogen in which case, the remaining two $R^1$ radicals can each contain 12 carbon atoms and greater, i.e., 12 to 18 carbon atoms.

Specific examples of suitable organoammonium molybdates and tungstates described herein include tridodecylammonium molybdates and tungstates, methyltricaprylammonium molybdates and tungstates, tri(tridecyl) ammonium molybdates and tungstates, and trioctylammonium molybdates and tungstates.

The organoammonium molybdate or tungstate or a mixture thereof, is employed at a level of about 0.01 to 50 millimoles molybdenum or tungsten per mole of total monomer, preferably 0.1 to 10 millimoles. The molar ratio of the alkylaluminum halide to the organoammonium molybdate and/or tungstate is not critical and can be in the range of about 200:1 or more to 1:10, preferably from 10:1 to 2:1 of aluminum to molybdenum or tungsten.

The norbornene-type monomers or cycloolefins that can be polymerized in bulk, in accordance with the process described herein, are characterized by the presence of at least one of the following norbornene group, identified by formula I, that can be substituted or unsubstituted:

Pursuant to this definition, suitable norbornene-type monomers include substituted and unsubstituted norbornenes, dicyclopentadienes, dihydrodicyclopentadienes, trimers of tricyclopentadiene, and tetracyclododecenes. Preferred monomers of the norbornene-type are those defined by the following formulas II and III:

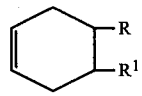 

(II)   (III)

where R and $R^1$ are independently selected from hydrogen, alkyl, and aryl groups of 1 to 20 carbon atoms, and saturated and unsaturated cyclic groups containing 3 to 12 carbon atoms formed by R and $R^1$ together with the two ring carbon atoms connected thereto. In a preferred embodiment, R and $R^1$ are independently selected from hydrogen and alkyl groups of 1 to 2 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene.

This invention especially contemplates preparation of homopolymers, copolymers and terpolymers of methylnorbornene, methyltetracyclododecene and dicyclopentadiene and especially homopolymers of methyltetracyclododecene and copolymers of methyltetracyclododecene and methylnorbornene. The copolymers of methyltetracyclododecene and methylnorbornene are polymerized from monomer mixtures containing from 1 to 75% by weight methylnorbornene and the copolymers contain from 1 to 75% by weight of polymerized methylnorbornene. The terpolymers are polymerized from monomer mixtures containing 1 to 75% by weight methylnorbornene and 25 to 99% by weight methyltetracyclododecene, with the remainder being dicyclopentadiene. The terpolymers contain from 1 to 75% by weight of polymerized methylnorbornene and 25 to 99% by weight polymerized methyltetrocyclododecene.

The monomer or mixture of norbornene-type monomers can contain up to about 20% by weight thereof of at least one other polymerizable monomer. Such other polymerizable monomers are preferably selected from mono- and dicycloolefins containing 4 to 12 carbon atoms, preferably 4 to 8 carbon atoms, examples of which include cyclobutene, cyclopentene, cyclopentadiene, cycloheptene, cyclooctene, 1,5-cyclooctadiene, cyclodecene, cyclododecene, cyclododecadiene, and cyclododecatriene. Also suitable are bicyclic olefins containing 7 to 16 carbon atoms and 1 to 4 double bonds, preferably 8 to 12 carbon atoms and 2 to 3 double bonds, such as norbornadiene.

At least one nonconjugated acyclic olefin can be used as a molecular weight modifier having at least one hydrogen on each double-bonded carbon atom and containing 2 to 12 carbon atoms, more preferably 3 to 8 carbon atoms. Preferably, the nonconjugated acyclic olefin is selected from 1-olefins and 2-olefins containing 3 to 8 carbon atoms such as 1-butene, 3-methyl-1-butene, 2-pentene, 4-methyl-2-pentene, and the like. Compounds not having hydrogen atoms substituted on double-bonded carbons are unreactive in this invention.

The nonconjugated acyclic olefin can be used in a molar ratio to total monomer charge of from about 0.0001 to about 1 mole per mole of the monomer charge. The nonconjugated acyclic olefin is charged directly with the monomers.

The system herein can be designed to give a pot life of at least about one-half minute at room temperature. In a preferred embodiment, the pot life is about 1 hour to about 8 hours.

Polymerization is interrelated with pot life. Generally, with respect to the system herein, the longer the pot life the longer it will take to complete polymerization at an elevated temperature. For instance, if a pot life of about one-half hour were designed for the system described herein, polymerization can be completed in as short a time as about one-half minute for a mold temperature of about 110° C., however, for a pot life of about 8 hours, polymerization may take a couple of minutes using similar reaction temperatures. Furthermore, reaction or polymerization temperature will also depend on the pot life as well as many other variables. If a system is designed to give a pot life of about 8 hours, it will take longer to carry out polymerization at the same mold temperature compared to a system designed for a shorter pot life. Polymerization time can be reduced by raising the mold temperature, however, mold temperature should be kept above 50° C. but below about 200° C., preferably in the range of 90° to 130° C.

Cycle time for reaction injection molding should be less than about 5 minutes, preferably less than about 2 minutes. Cycle time includes mold filling, monomer heat-up, polymerization, cooling and demolding. Mold filling requires about 10 to 30 seconds. Assuming a mold temperature of 120° C., the monomer will reach a temperature where polymerization starts in about 45 seconds. Most of the polymerization occurs during the polymerization exotherm of about 5–10 seconds which reaches about 230° C. The molded part begins to cool down to mold temperature. When the part is sufficiently cooled in 1 to 2 minutes, the mold is opened and the part removed.

Reaction injection molding (RIM), a form of bulk polymerization, is a low pressure, one-step or one-shot injection of liquid components into a closed preheated mold where rapid polymerization occurs resulting in a molded plastic product. In a RIM process, viscosity of the materials fed to a mold is about 10 to 10,000 cps, preferably about 1500 cps, at injection temperatures varying from room temperature for urethanes to about 150° C. for lactams. Mold temperatures in a RIM process are in the range of about 100° to 200° C. and pressures in the mold are generally in the range of about 10 to 150 psi. At least one component in the RIM formulation is a monomer that is polymerized to a polymer in the mold. The main distinction between injection molding and RIM resides in the fact that in RIM, a chemical reaction takes place in the mold to transform a monomer to a polymeric state. For practical purposes, the chemical reaction must take place rapidly in less than about 2 minutes, in a preferred embodiment.

The invention described herein is illustrated by the following example in terms of specific materials and operating conditions employed.

EXAMPLE 1

This example demonstrates preparation of impact modified methyltetracyclododecene (MTD) by ring opening bulk polymerization employing a metathesis catalyst. The materials used herein included Ethyl 330 antioxidant, a 0.5 molar solution of 1-propanol in MTD, a 0.5 molar solution of diethylaluminum chloride (DEAC) in MTD, and a 0.1 molar tri(tridecylammonium)molybdate (TTAM) catalyst.

Preparation of an impact modified polycycloolefin involved the addition of 1.2 g of the Ethyl 330 antioxidant to a 7-oz. bottle flushed with nitrogen, followed by 80 g of MTD. The bottle was then placed in an oven heated to 100° C. for about 3 hours to dissolve the antioxidant. This is an optional step and can be omitted. The bottle was then removed from the oven and cooled to room temperature while under a blanket of nitrogen. At this point, the following were added: impact modifying components in amounts specified below, 7.4 ml of the propanol solution, 4.6 ml of diethylaluminum chloride and 5.8 ml of tri(tridodecyl)ammonium molybdate catalyst solutions. The catalyst and the cocatalyst were added with a syringe. After addition of each of the above ingredients at room temperature, the bottle was shaken to thoroughly mix the contents thereof. The cocatalyst herein was formed in several seconds in situ by the reaction of the alkylaluminum halide with the alcohol that yielded propoxyethylaluminum chloride that is believed to have the following formula:

$$(C_3H_7O)_{1.6}(C_2H_5)_{0.4}AlCl$$

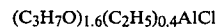

The molar ratio of n-propanol to aluminum was 1.6/1, the molar ratio of MTD to aluminum was 200/1, and the molar ratio of aluminum to molybdenum was 4/1. The molybdate catalyst employed is believed to have the following formula and the proper chemical term thereof is tetrakis-tri(tridecyl) ammonium molybdate:

$$[H(C_{13}H_{27})N]_4Mo_8O_{26}.$$

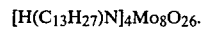

After thoroughly mixing the ingredients, vacuum was applied to the contents of the bottle while shaking it to remove dissolved gases following which, the vacuum was broken with nitrogen and the contents of the bottle were added to a 2-plate mold preheated to 120° C. and flushed with nitrogen. There was no evidence of polymerization taking place at room temperature.

When the monomer mix was deposited in the mold, it took only 2 to 3 minutes for polymerization to take place. As already described, temperature in the mold initially dropped to about 50° to 60° C. when the monomer mix was introduced into the mold and thereafter, within a span of less than 2 minutes, it rose gradually to 80° to 90° C. in about one-half minute, then rapidly rose to about 230° C. This sharp temperature rise indicated the polymerization exotherm following thermal initiation. The reaction temperature thereafter quickly dropped to the mold temperature. The solid, molded object started to cool and was extracted by opening the mold. Plaque sample was obtained that measured 4"×5"×¼".

A number of experiments were run and samples of molded plaques were obtained with the addition of a polyolefin and a rubbery material impact modifier that were subjected to the Notched Izod impact test, ASTM No. D-256. Amount and type of polyolefin and rubbery material used and the impact test data is summarized in Table I, below:

TABLE I

| Exp. No. | Polyolefin phm | Rubbery Matl., phm | Notched Izod, J/M | HDT °C. |
|---|---|---|---|---|
| 1 | — | — | 44 | — |
| 2 | — | 5 (KR) | 85 | — |
| 3 | 5 (M) | — | 66 | — |
| 4 | 10 (M) | — | 157 | — |
| 5 | 15 (M) | — | 110 | — |
| 6 | 10 (M) | 5 (KR) | 323 | — |
| 7 | 10 (M) | 5 (KR) | 309 | — |
| 8 | 10 (M) | 5 (KR) | 299 | — |
| 9 | 10 (M) | 5 (KR) | 287 | — |
| 10 | 25 (SDP13) | 10 (KR) | 300 | — |
| 11 | 10 (M) | 2 (EP) | 188 | — |
| 12 | 2 (M) | 2 (KR) | 67 | 126 |
| 13 | 5 (M) | 5 (KR) | 205 | 126 |
| 14 | 10 (M) | 2 (KR) | 164 | 122 |
| 15 | 2 (M) | 10 (KR) | 281 | 130 |
| 16 | 7 (M) | 3 (KR) | 172 | 119 |
| 17 | 10 (M) | 5 (KR) | 135 | 120 |
| 18 | 10 (M) | 5 (KR) | 180 | 121 |

In the above Table, "KR" stands for Shell's Kraton 1650G that is a hydrogenated block copolymer of sytrene-butadiene-styrene, "M" represents USI's Microthene 510 polyethylene powder, "SDP13" is Arco's SDP 1113 polyethylene powder, and "EP" is an ethylene-propylene elastomer that contains about 65% ethylene about 35% propylene, on weight basis, and has little crystallinity. Additional data on the pertinent polyolefin components of the impact modifier is given below in Table II:

TABLE II

| Polyethylene | Density g/cc | Melt Index | Particle Size, microns |
|---|---|---|---|
| Arco SDP 1113 | 0.958 | 16–18 | 125–250 |
| Amoco 41-305 | 0.952 | 0.8 | 125–250 |
| Hercules 1900 | 0.950 | 0.0 | 420 |
| Microthene 510 | 0.924 | 5 | 8.6–30.7 |

The results in Table I demonstrate that notched Izod of poly MTD increased from 44 J/M to 85 J/M when 5 parts by weight of "KR" rubbery material was incorporated during bulk polymerization of MTD. At levels of the KR material above 5 parts, viscosities became unmanageable and heat distortion temperature of the products dropped drastically. With 10 parts by weight of "M" polyolefin, the modified poly MTD had notched Izod of 157 J/M. It should be apparent that individually, neither the polyolefin component nor the rubbery component increased notched Izod sufficiently to render poly MTD ductile. Experiment 6 shows the use of 10 parts of polyethylene powder and 5 parts of the SBS block copolymer that improved notched Izod to 323 J/M, which is in a ductile mode. This experiment was repeated, note Experiments 7, 8 and 9, and notched Izod values obtained were 309,299 and 287, respectively. In Experiment 10, 25 parts of another polyethylene powder and 10 parts of the same SBS block copolymer were polymerized in bulk together with MTD, that yielded a notched Izod of 300 J/M. When 2 parts of an ethylene-propylene copolymer and 10 parts of Microthene ® polyethylene were polymerized with MTD, the impact modified poly MTD had a notched Izod of 188 J/M. Although the value of 188 J/M is indicative of a brittle material, increasing the rubber component from 2 to 5 or 10 would appear to produce ductile polycycloolefins. Furthermore, as confirmed by Experiments 12 to 18, impact modification of polycycloolefins as described herein does not destroy the heat distortion temperature (HDT), as would normally be expected.

Although 10 parts of Microthene polyethylene improved impact from 44 J/M notched Izod for unmodified poly MTD to 157 J/M for modified poly MTD, 5 parts of Amoco 4-305 and Hercules 1900 gave notched Izod of 50 J/M and 52 J/M, respectively.

I claim:

1. Process for preparing impact modified polycycloolefins comprising feeding a liquid mix into a mold maintained at an elevated temperature whereby ring opening polymerization in bulk of said liquid mix is thermally initiated, and extracting molded impact modified polycycloolefin from the mold; said liquid mix comprising an organoammonium catalyst selected from organoammonium molybdates and tungstates, an alkoxyalkylaluminum halide cocatalyst or reactants needed to make said cocatalyst in situ, at least one monomer containing at least one norbornene group, a crystalline polyolefin selected from lower polyolefin powders or polyvinylidene fluoride powder and a rubbery polymeric material, the amount of said polyolefin or polyvinylidene fluoride and said rubbery material being sufficient to render said polycycloolefin ductile which occurs at a notched Izod of about 250 J/M and above.

2. Process of claim 1 wherein said polyolefin powder is selected from unsubstituted polyolefins of 2 to 3 carbon atoms in the repeating unit, and said rubbery material is soluble in said monomer and does not kill or substantially inhibit activity of said catalyst.

3. Process of claim 2 wherein said monomer is selected from the following monomers, and mixtures thereof:

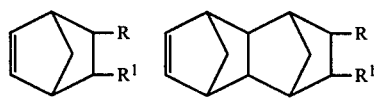

where R and R¹ are independently selected from hydrogen, alkyl, and aryl groups of 1 to 20 carbon atoms, and saturated and unsaturated cyclic groups containing 3 to 12 carbon atoms formed by R and R¹ and the two ring carbon atoms connected thereto; amount of said catalyst being 0.01 to 50 millimoles molybdenum or tungsten per mol of monomer(s) and the molar ratio of said cocatalyst as aluminum to said catalyst as molybdenum or tungsten is in the range of about 200:1 to 1:10.

4. Process of claim 3 wherein said polyolefin is selected from polyethylene having a density of about 0.91 to 0.97 g/cc and particle size less than about one-half millimeter, and said rubbery material is selected from diene rubbers, ethylenic rubbers, and hydrogenated butadienic rubbers.

5. Process of claim 4 wherein R and R¹ of said monomer are independently selected from hydrogen and alkyl groups of 1 to 2 carbon atoms; said liquid mix has a pot life of at least about one hour at room temperature and is polymerized in less than about 5 minutes after being thermally initiated; said catalyst is selected from catalyst defined by the following formulas I and II:

   (I)

   (II)

where each R and R¹ group is independently selected from hydrogen, alkyl, and alkylene groups each containing 1 to 20 carbon atoms, and cycloaliphatic groups each containing 5 to 16 carbon atoms, the sum of all carbon atoms represented by said R groups is 20 to 72 and the sum of all carbon atoms represented by said R¹ groups is 15 to 54, M is selected from molybdenum (VI) and tungsten (VI), and x and y represent the number of M and O atoms in the molecule; and said cocatalyst is selected from those defined by the following formula:

where R is an alkyl radical of about 1 to 18 carbon atoms, R¹ is an alkyl radical of about 1 to 12 carbon atoms, X is a halogen, "a" indicates equivalents of the alkoxy group RO— varying from about ½ to about 2½, "b" indicates the number of atoms of alkyl group R¹ varying from about ¼ to about 2, and "c" indicates the number of halogen atoms varying from about ½ to about 2.

6. Process of claim 5 wherein in the formula for said cocatalyst, "a" varies from about 1 to about 1¾, "b" varies from about ½ to about 1, and "c" varies from about ¾ to about 1¼.

7. Process of claim 6 wherein in the formula for said cocatalyst, R contains 2 to 4 carbon atoms, and R¹ contains 2 to 4 carbon atoms; wherein said monomer is selected from substituted and unsubstituted 2-norbornenes, dicyclopentadienes, dihydrodicyclopentadienes, trimers of cyclopentadienes, and tetracyclododecenes; wherein said liquid mix has a pot life of about 1 to 8 hours and is polymerized in the mold at a temperature in the range of 60° to 200° C. in less than 5 minutes; and wherein said rubbery material is selected from polymers of ethylene and propylene, polybutadiene, copolymers and terpolymers of butadiene, and block polymers of butadiene.

8. Process of claim 7 wherein said impact modified polycycloolefins have a ductile mode on fracture, said catalyst is selected from tridodecylammonium, tri(tridecyl) ammonium, and trioctylammonium molybdates and tungstates; and said impact modifier is polyethylene powder having particle size of one-quarter millimeter and less.

9. Process of claim 7 wherein said rubbery material is selected from hydrogenated block copolymer of styrene-butadiene-styrene, copolymers of butadiene and styrene, and copolymers of ethylene and propylene, amount of said rubbery material being 2 to 10 parts and amount of said polyolefin being 5 to 10 parts, on weight basis, per 100 parts of said monomer.

10. Impact modified polycycloolefin made by the process of claim 1.

11. Impact modified ductile polycycloolefin made by the process of claim 9.

* * * * *